Figure 1:
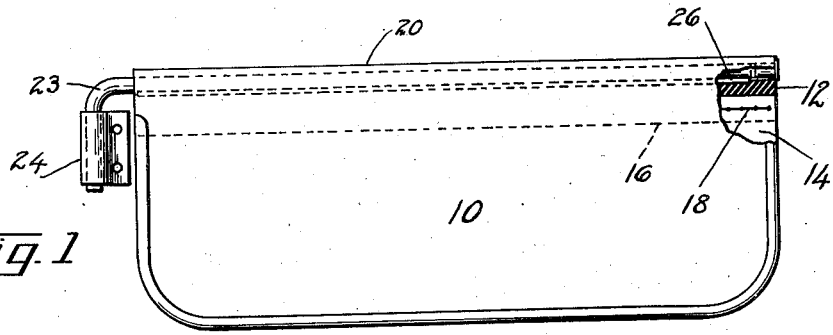

Dec. 28, 1937.                W. O. MELLER                2,103,863
VISOR CONSTRUCTION
Filed Dec. 28, 1936

INVENTOR.
WILLIAM O. MELLER
BY Parker & Burton
ATTORNEYS

Patented Dec. 28, 1937

2,103,863

UNITED STATES PATENT OFFICE 2,103,863

VISOR CONSTRUCTION

William O. Meller, Monroe, Mich., assignor to Woodall Industries Incorporated, Detroit, Mich., a corporation of Michigan Application December 28, 1936, Serial No. 117,732

8 Claims. (Cl. 296—95)

This invention relates to improvements in adjustable visors. Visors of the type to which this invention pertains are commonly used within the interior of automobile closed bodies and are so constructed as to be swung upwardly toward the roof out of the line of vision of the driver of the vehicle or to be swung downwardly over a portion of the windshield to protect the driver's eyes from the rays of the sun.

This invention is concerned particularly with improvements to that type of visor illustrated in U. S. Patent 2,057,009, dated October 13, 1936, wherein the visor panel is provided with a tubular element which receives a visor supporting rod about which the visor panel is rotatable for adjustment to various positions with respect to the occupant of the vehicle.

In such prior patent this tubular element was formed of rubber. It gripped the rod to retain the visor at any position to which it might be rotated about the rod. Difficulty was at times encountered with this construction in that the visor would not always maintain the position to which it had been rotated but would spring back. The visor might be moved toward the roof of the vehicle to an out of the way position for clear vision but instead of retaining the position against the ceiling to which it had been moved it would spring back downwardly a limited distance.

Difficulty was also at times encountered in that the rod was too tightly gripped by the tubular rubber element and adjustable movement could be obtained only against too great resistance. The present invention relates to improvements intended to insure free and easy rotatable adjustment of the visor to any desired position and the retention of the visor at such position to which it may be rotated.

Figure 2:
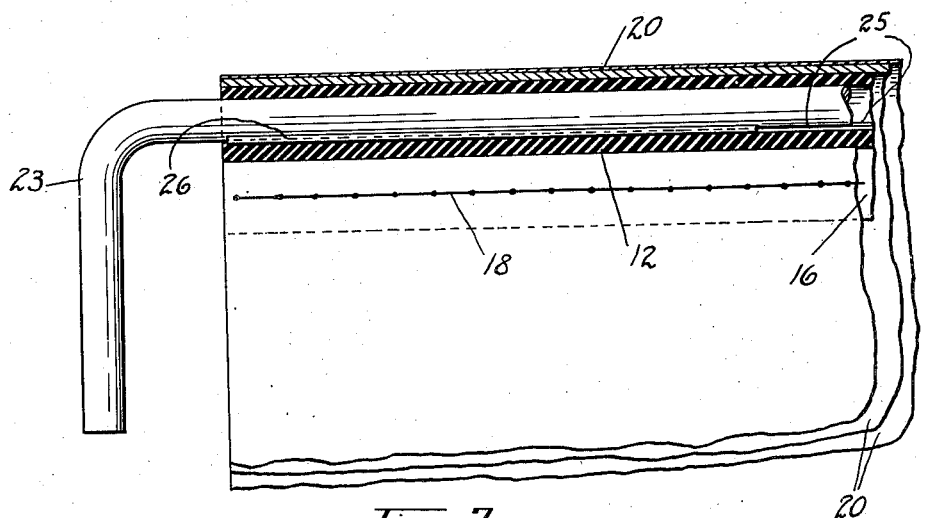
Figure 4:
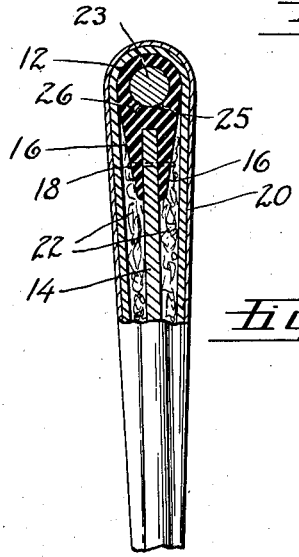
Figure 3:
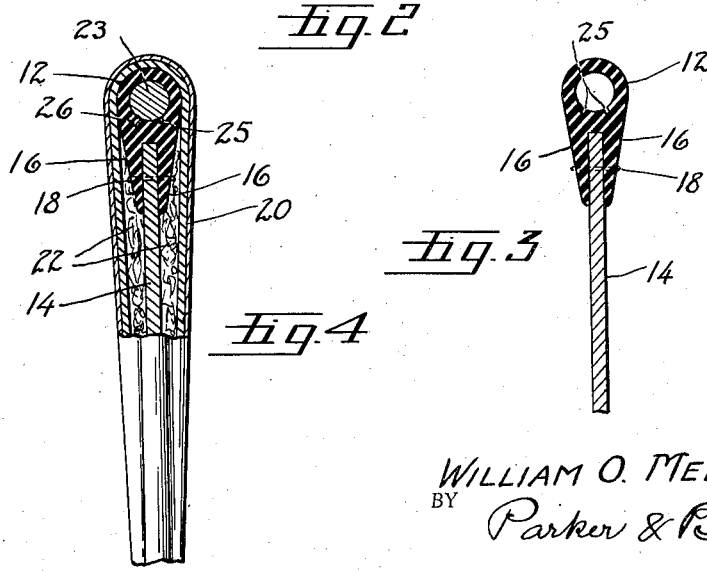

Other objects, advantages and meritorious features of this invention will more fully appear from the following description, appended claims, and accompanying drawing wherein a visor illustrating the improvements herein set forth is shown. In the drawing;

Figure 1 is an elevation partly broken away of a visor embodying this invention, Fig. 2 is an enlarged view partly in cross section and partly broken away of a fragment of the visor shown in Fig. 1, Fig. 3 is a cross sectional view through a portion of the visor assembly, and Fig. 4 is a similar cross sectional view through the complete visor assembly.

In the drawing let 10 indicate the visor panel assembly having a tubular rubber element or strip 12 extending along one margin thereof. In this particular construction the panel assembly follows generally the structure shown in the patent above referred to in that the visor panel is made up of a relatively stiff panel foundation board 14 one edge of which is received within a channel formed in a lip 16 along one side of the tubular strip 12. This board may be stitched in place as at 18. It may be covered with suitable laminated material 20 folded thereover and bound at the edges as shown in Figs. 1 and 4. In Fig. 4 wadding 22 is shown interposed between the foundation board 14 and the laminated covering sheet 20. This cover sheet may comprise an outer layer of fabric or artificial leather stretched over an inner layer of flexible composition material which might be a thermoplastic composition fiber board as described in the patent above cited.

The particular panel assembly as regards the make up of the plies and the character thereof forms no part of the instant invention. The invention heredisclosed relates to the mounting of the panel upon the supporting rod. The supporting rod is indicated as 23. It is shown as secured at one end in a bracket 24. The rod extends through the tubular rubber element 12 as shown in the several figures of the drawing. It is of such a size that it is grippingly engaged by the tubular rubber element so that when the panel is rotated about the rod it is against the frictional gripping action of the tube 12 and such tubular strip tends to retain the position to which it has been rotated about the rod.

Preferably the rubber tubing is provided with channels 25 extending lengthwise of its inner wall. One or more of these channels may be provided. Two are here shown. A wire-like strand 26 is disposed in one of these channels as shown in Figs. 2 and 4. This strand may be of soft iron or other soft metal. Preferably it is flexible and has a diameter substantially greater than the depth of the channel so that when inserted in the channel it engages the rod and holds the tube away from the rod along the length of the wire. By wire is meant any similar strand-like element that will function in a similar manner.

With visors made up precisely as shown in the patent referred to it was found that in certain cases the panels could be adustably rotated only with considerable difficulty and also they did not retain the exact position to which they rotated about the supporting rod. Instances occurred wherein the visor would be rotated to an out of the way position against the headlining of the body but would, upon release, spring downwardly for a limited distance. It has been found that with the use of the strand of the character here set forth extending lengthwise of the tube in the manner shown that the visor may be rotated about the road freely and easily and will retain the position to which it is rotated without the spring back referred to. Though the strand 26 is shown as disposed within one of the channels 25 it has been found that the device functions in a satisfactory manner even though the strand is not so disposed and though it may tend to wrap partly around the rod or escape entirely from the channel.

What I claim:

1. In a visor assembly, a visor panel provided with a tubular rubber pivot mounting, a supporting rod received within said mounting supporting the visor for rotatable adjustment about the rod, a soft metal wire extending lengthwise through said tubular mounting engaging said rod and holding the mounting away from the rod along the wire.

2. In a visor assembly, a visor panel provided with a tubular rubber pivot mounting, a supporting rod received within said mounting supporting the visor for rotatable adjustment about the rod, a flexible cylindrical strand like element extending longitudinally through said tube between the inner wall of the tube and the rod and deforming the tube along said strand outwardly away from the rod.

3. In a visor assembly, a visor panel provided with a tubular rubber pivot mounting having a linearly extending channel formed in the inner wall of the tube, a supporting rod received within said mounting and supporting the visor for rotatable adjustment about the rod, a wire like element extending linearly through said tube within said channel engaging said rod and holding the rubber mounting away from the rod therealong.

4. In a visor assembly, a visor panel provided with a tubular rubber pivot mounting having a linearly extending channel formed in the inner wall of the tube, a supporting rod received within said mounting and supporting the visor for rotatable adjustment about the rod, a wire like element extending linearly through said tube within said channel and having a diameter substantially greater than the depth of the channel.

5. A visor assembly comprising a visor panel having a resilient tubular gripping element extending along one margin of the panel, a supporting rod received within said tubular element and grippingly engaged thereby for rotation of the element thereabout, said element adapted to be grippingly retained at any position to be rotated about the rod, and a strand like member extending through said tubular element alongside of said rod spacing the rod from the wall of the tube alongside of said strand.

6. A visor assembly comprising a visor panel having a tubular gripping element extending along one margin of the panel, a supporting rod-like element received within said tubular element and grippingly engaged thereby for rotation of the tubular element about the rod like element, said tubular element adapted to be grippingly retained at any position to which it is rotated about said rod-like element, one of said elements provided with a strand-like member extending linearly therealong engaging the opposed face of the other element and holding the wall of the tube-like element away from the rod along said line of said strand.

7. A visor assembly comprising a visor panel having a tubular gripping element extending along one margin of the panel, a supporting rod received within said tubular element and grippingly engaged thereby for rotation of the element thereabout, said tubular element adapted to be grippingly retained at any position to which it is rotated about said rod and provided with a channel extending linearly of its inner wall and means disposed within said channel engaging said rod to facilitate rotation of the tube about the rod.

8. A visor assembly comprising a visor panel having a tubular gripping element extending along one margin of the panel, a supporting rod element received within said tubular element, said tubular element adapted to grippingly retain any position to which it is rotated about said rod, one of said elements provided with a linearly extending channel open to the opposed face of the other element, and a strand like member disposed within said channel and projecting therefrom holding the opposed face of the other element spaced therefrom.

WILLIAM O. MELLER.